US012607835B2

(12) United States Patent　　　　(10) Patent No.: US 12,607,835 B2
Kodo　　　　　　　　　　　　　　(45) Date of Patent: Apr. 21, 2026

(54) OPTICAL DEVICE

(71) Applicant: Toshiba Tec Kabushiki Kaisha, Tokyo (JP)

(72) Inventor: Masahiro Kodo, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 18/541,992

(22) Filed: Dec. 15, 2023

(65) Prior Publication Data

US 2024/0231061 A1　　Jul. 11, 2024

(30) Foreign Application Priority Data

Jan. 10, 2023　(JP) ................................. 2023-001943

(51) Int. Cl.
| *G02B 17/00* | (2006.01) |
| *G02B 17/08* | (2006.01) |
| *H04N 1/028* | (2006.01) |
| *H04N 1/03* | (2006.01) |

(52) U.S. Cl.
CPC ......... G02B 17/002 (2013.01); G02B 17/086 (2013.01); H04N 1/0285 (2013.01); H04N 1/0306 (2013.01)

(58) Field of Classification Search
CPC .. G02B 17/002; G02B 17/086; H04N 1/0306; H04N 1/0285
See application file for complete search history.

(56) References Cited

U.S. PATENT DOCUMENTS

| 2013/0038915 | A1* | 2/2013 | Kusaka | ................ G02B 3/0062 |
| | | | | 359/201.1 |
| 2016/0216635 | A1 | 7/2016 | Shiraishi | |
| 2019/0052768 | A1 | 2/2019 | Shiraishi | |
| 2021/0271185 | A1* | 9/2021 | Shiraishi | .............. G02B 17/002 |

FOREIGN PATENT DOCUMENTS

JP　　2019-161381　A　　9/2019

* cited by examiner

*Primary Examiner* — Angela M. Medich
(74) *Attorney, Agent, or Firm* — FOLEY & LARDNER LLP

(57)　　　　　ABSTRACT

An optical device includes a light source unit, an optical member, and a holder formed by a single member. The light source unit includes a light source that emits light in a first direction and has a first positioning surface orthogonal to the first direction. The optical member is disposed to be separated from and opposed to the light source unit in the first direction and has an incident surface, an emission surface, and a second positioning surface. The holder has a third positioning surface and a fourth positioning surface, holds the light source unit in a state in which the first positioning surface of the light source unit is set in surface contact with the third positioning surface, and holds the optical member in a state in which the second positioning surface of the optical member is set in surface contact with the fourth positioning surface.

20 Claims, 9 Drawing Sheets

OPTICAL DEVICE

CROSS-REFERENCE TO RELATED APPLICATION

This application is based upon and claims the benefit of priority from Japanese Patent Application No. 2023-001943, filed on Jan. 10, 2023, the entire contents of which are incorporated herein by reference.

FIELD

Embodiments described herein relate generally to an optical device including a lens mirror array.

BACKGROUND

A lens mirror array is made of, for example, transparent resin and has long structure in which a plurality of very small optical elements are linearly integrally disposed side by side. Each of the optical elements has, on the surface thereof, an incident-side lens surface on which light from a light emitting unit is made incident, an emission-side lens surface from which the incident light is emitted, and a reflection surface that reflects the light made incident from the incident-side lens surface toward the emission-side lens surface. The lens mirror array is used in, for example, a printer or a copying machine installed in a workplace.

If the lens mirror array is built in an exposure device of a copying machine, the lens mirror array is attached to, for example, a holder that holds the light emitting unit. In this case, the lens mirror array is attached to the holder in a direction in which the incident-side lens surface of each of the optical elements is opposed to the light emitting unit. The lens mirror array relatively easily bends and easily warps because the lens mirror array has substantially the same length as the length in the axial direction of a photoconductive drum. Therefore, the lens mirror array needs to be attached to the exposure device in a state in which the lens mirror array is fixed to the holder, which is a rigid body.

In the lens mirror array, a focal length between the incident-side lens surface and the light emitting unit of each of the optical elements needs to be accurately set. In order to position the lens mirror array with respect to the light emitting unit, light from the light emitting unit is actually emitted through the lens mirror array, an image of the light is detected by a camera or the like, and a fixing position of the lens mirror array to the holder is finely adjusted. However, since the lens mirror array is flexible and easily bends, it is difficult to accurately position the incident-side lens surface of each of the optical elements with respect to the light emitting unit and attach the lens mirror array to the holder.

DETAILED DESCRIPTION

Figure 1:
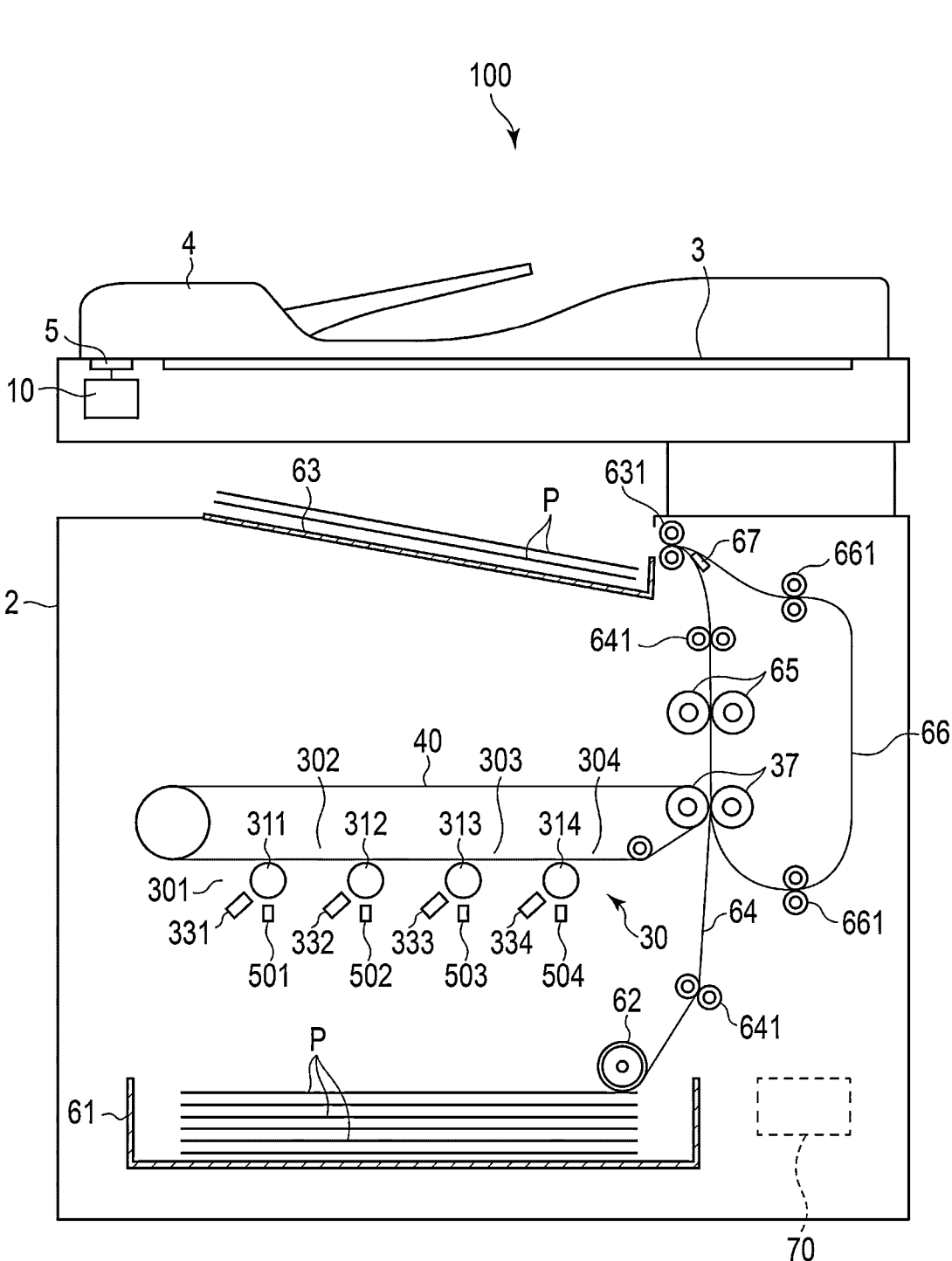
FIG. 1 is a schematic diagram illustrating an image forming apparatus according to one embodiment.

An object of embodiments is to provide an optical device in which an optical member can be accurately positioned.

An optical device in an embodiment includes a light source unit (e.g., a light source device, a light bulb, etc.), an optical member, and a holder formed by a single member. The light source unit includes a light source that emits light in a first direction and has a first positioning surface orthogonal to the first direction. The optical member is disposed to be separated from and opposed to the light source unit in the first direction and has an incident surface on which the light emitted from the light source is made incident, an emission surface from which the light made incident via the incident surface is emitted, and a second positioning surface provided in a position orthogonal to the first direction and overlapping the first positioning surface in the first direction. The holder has a third positioning surface that is in surface contact with the first positioning surface and a fourth positioning surface that is in surface contact with the second positioning surface and is provided in a position overlapping the third positioning surface in the first direction, holds the light source unit in a state in which the first positioning surface of the light source unit is set in surface contact with the third positioning surface, and holds the optical member in a state in which the second positioning surface of the optical member is set in surface contact with the fourth positioning surface.

An embodiment is explained below with reference to the drawings. Note that, in the drawings referred to in the following explanation, scales of units are sometimes changed as appropriate. In the drawings, to facilitate explanation, components are sometimes simplified or omitted.

An image forming apparatus 100 illustrated in FIG. 1 is a so-called multifunction peripheral including, for example, a print function, a copy function, and a scan function.

The image forming apparatus 100 includes a housing 2. A transparent original table glass 3, on which an original document is set, is present on an upper surface of the housing 2. A reading glass 5 disposed flush with the original table glass 3 is present on the upper surface of the housing 2. The original table glass 3 and the reading glass 5 are disposed side by side in the left-right direction (e.g., a sub-scanning direction, etc.) in FIG. 1.

An auto document feeder (ADF) 4 is present on the original table glass 3. The ADF 4 is capable of opening and closing the original table glass 3. The ADF 4 functions as an original cover that presses an original document placed on the original table glass 3. The ADF 4 has a function of feeding the original document through the reading glass 5.

An original reading device 10 is present in the housing 2 below the original table glass 3. The original reading device 10 is an example of the optical device described in the claims of this application. The original reading device 10 includes a lens mirror array 20 explained below extended in a direction orthogonal to the paper surface (e.g., a main scanning direction, etc.). The original reading device 10 is movable in the sub-scanning direction along the original table glass 3 by a not-illustrated driving mechanism and can be fixed under the reading glass 5 (e.g., a position illustrated in FIG. 1). The original reading device 10 causes an image sensor 101 (FIG. 10) explained below to form an erected image of an original document.

If an original document is read, for example, the original reading device 10 is fixed under the reading glass 5 (e.g., a state illustrated in FIG. 1) and the original document is fed by the ADF 4 and irradiated with illumination light via the reading glass 5. The lens mirror array 20 guides reflected light from the original document and forms an image on the image sensor 101. The original reading device 10 photo-electrically converts the reflected light from the original document received by the image sensor 101 and outputs the reflected light as an image signal.

At this time, the original reading device 10 reads, line by line in the main scanning direction, the erected image of the original document passing on the reading glass 5 according to the operation of the ADF 4. If the original document passes the reading glass 5 in the sub-scanning direction, it is possible to acquire an image of the entire original document (e.g., for a plurality of lines, for sections, etc.).

Alternatively, if the original document is set on the original table glass 3 and the original reading device 10 is moved in the sub-scanning direction along the original table glass 3, similarly, it is possible to read, line by line in the main scanning direction, an erected image of the original document formed on the image sensor 101 via the lens mirror array 20 and acquire an image of the entire original document.

The image forming apparatus 100 includes an image forming unit (e.g., an image former, etc.) 30 substantially in (e.g., near, adjacent to, proximate to, etc.) the center in the housing 2. The image forming unit 30 includes a yellow unit (e.g., a yellow color provider, etc.) 301, a magenta unit (e.g., a magenta color provider, etc.) 302, a cyan unit (e.g., a cyan color provider, etc.) 303, and a black unit (e.g., black color provider, etc.) 304 in a traveling direction of an intermediate transfer belt 40. Since the color units (e.g., color providers, toner providers, ink providers, etc.) 301, 302, 303, and 304 of the image forming unit 30 have substantially the same structure, the black unit 304 is representatively explained below. Detailed explanation about the other color units 301, 302, and 303 is omitted.

Figure 2:
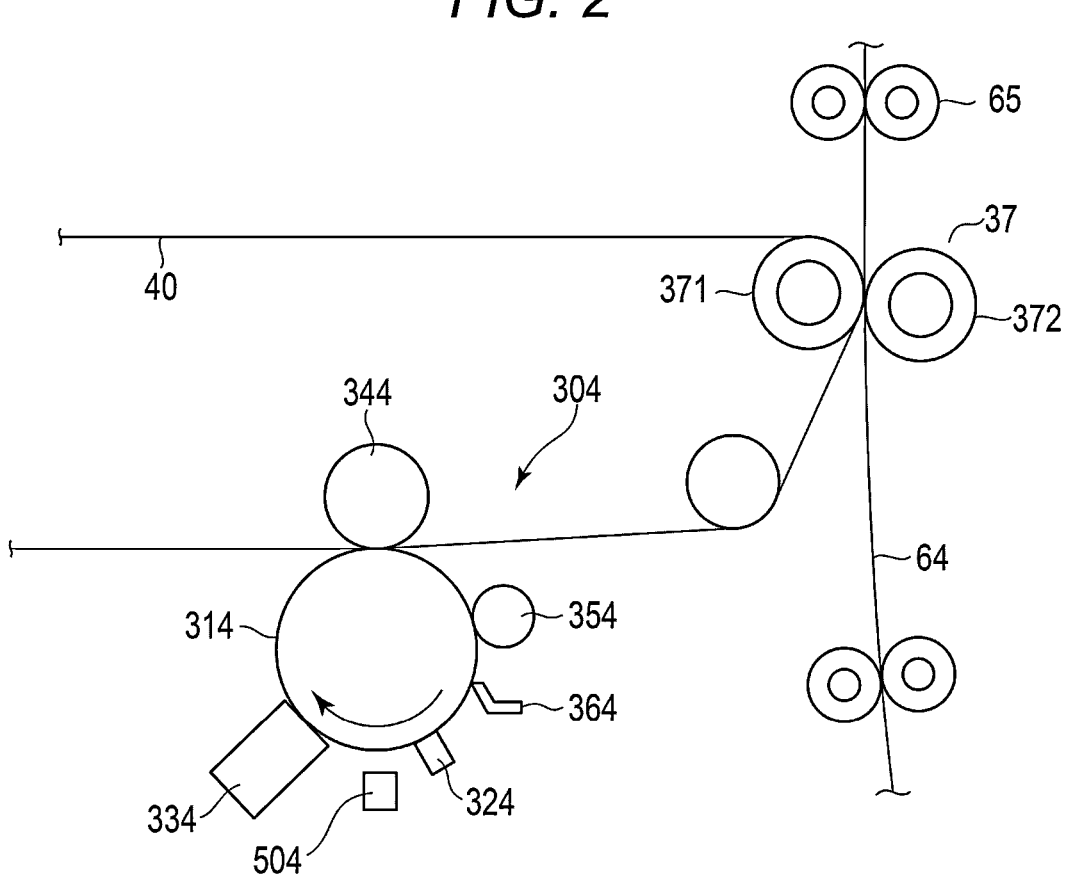
FIG. 2 is a schematic diagram illustrating a black unit of the image forming apparatus of FIG. 1.

As illustrated in FIG. 2, the black unit 304 includes, for example, a photoconductive drum 314, an electrifying charger 324, a solid-state head 504, a developing device 334, a primary transfer roller 344, a cleaner 354, and a blade 364. The solid-state head 504 is an example of the optical device described in the claims of this application. The solid-state head 504 includes the lens mirror array 20 explained above. The intermediate transfer belt 40 is wound around a plurality of rollers and endlessly stretched and travels in the counterclockwise direction in FIG. 2.

The photoconductive drum 314 has a rotation axis extending in the main scanning direction. The photoconductive drum 314 rotates in a state in which the outer circumferential surface thereof is set in contact with the surface of the intermediate transfer belt 40. The primary transfer roller 344 is present on the inner side of the intermediate transfer belt 40 opposed to the photoconductive drum 314. The photoconductive drum 314 is rotated in an arrow direction (e.g., the clockwise direction) in FIG. 2 at the same peripheral speed as the peripheral speed of the intermediate transfer belt 40 by a not-illustrated driving mechanism.

The electrifying charger 324 uniformly charges the surface of the photoconductive drum 314. The solid-state head 504 irradiates the surface of the photoconductive drum 314 with exposure light based on an image signal for color-separated black and forms an electrostatic latent image based on the image signal for black on the surface of the photoconductive drum 314. The developing device 334 supplies black toner to the electrostatic latent image formed on the surface of the photoconductive drum 314 and forms a black toner image on the surface of the photoconductive drum 314.

The primary transfer roller 344 transfers the black toner image formed on the surface of the photoconductive drum 314 onto the intermediate transfer belt 40 to be superimposed on toner images of the other colors. The cleaner 354 and the blade 364 remove toner remaining on the surface of the photoconductive drum 314. The color toner images transferred to be superimposed on the surface of the intermediate transfer belt 40 move according to the traveling of the intermediate transfer belt 40.

A transfer roller pair 37 for transferring the color toner images transferred to be superimposed on the surface of the intermediate transfer belt 40 onto paper P is present on the downstream side of the black unit 304 in the traveling direction of the intermediate transfer belt 40. One transfer roller 371 is present on the inner side of the intermediate transfer belt 40. The intermediate transfer belt 40 is supported by one transfer roller 371. The other transfer roller 372 is opposed to one transfer roller 371 across the intermediate transfer belt 40.

Referring back to FIG. 1, a paper feeding cassette 61 in which a plurality of pieces of paper P of a predetermined size are stacked and stored is present near the lower end in the housing 2 of the image forming apparatus 100. The paper feeding cassette 61 can be drawn out and housed in, for example, from the front surface of the housing 2. A pickup roller 62 that picks up the paper P at the uppermost end in a stacking direction of the paper P stored in the paper feeding cassette 61 is present in the right end upward direction of the paper feeding cassette 61 illustrated in FIG. 1. The pickup roller 62 rotates with the circumferential surface set in contact with the paper P to pick up the paper P piece by piece.

A paper discharge tray 63 is present in an upper part in the housing 2. The paper discharge tray 63 is present between the original table glass 3 and the image forming unit 30 and discharges the paper P, on which an image is formed, into a body of the image forming apparatus 100. A conveyance path 64 for conveying the paper P picked up from the paper feeding cassette 61 in the longitudinal direction toward the paper discharge tray 63 is present between the pickup roller 62 and the paper discharge tray 63. The conveyance path 64 extends through a nip of the transfer roller pair 37 and includes a plurality of conveying roller pairs 641 and a not-illustrated conveyance guide. A paper discharge roller pair 631 for discharging the paper P to the paper discharge tray 63 is present at the terminal end of the conveyance path 64. The paper discharge roller pair 631 is capable of rotating in both normal and reverse directions (e.g., clockwise, counterclockwise, etc.).

A fixing roller pair 65 is present on the conveyance path 64 on the downstream side (e.g., the upper side in FIG. 1) of the transfer roller pair 37. The fixing roller pair 65 heats and pressurizes the paper P conveyed via the conveyance path 64 and fixes, on the surface of the paper P, a toner image transferred on the surface of the paper P.

The image forming apparatus 100 includes a reverse conveyance path 66 for reversing the paper P, on one surface of which an image is formed, and feeding the paper P into the nip of the transfer roller pair 37. The reverse conveyance path 66 includes a plurality of conveying roller pairs 661 that hold the paper P and rotate to convey the paper P and a not-illustrated conveyance guide. A gate 67 that switches a conveyance destination of the paper P between the conveyance path 64 and the reverse conveyance path 66 is present on the upstream side of the paper discharge roller pair 631.

If forming an image on the paper P, the image forming apparatus 100 rotates the pickup roller 62 to pick up the paper P from the paper feeding cassette 61 and conveys the paper P toward the paper discharge tray 63 via the conveyance path 64 with the plurality of conveying roller pairs 641. At this time, the image forming apparatus 100 feeds color toner images transferred and formed on the surface of the intermate transfer belt 40 into the nip of the transfer roller pair 37 according to conveyance timing of the paper P, applies a transfer voltage to the color toner images with the transfer roller pair 37, and transfers the color toner images onto the surface of the paper P.

The image forming apparatus 100 conveys the paper P, on which the toner images are transferred, through the fixing roller pair 65 to heat and pressurize the paper P, which melts the toner images, and presses the toner images against the surface of the paper P to fix the toner images on the paper P. The image forming apparatus 100 discharges the paper P, on which an image is formed in this way, to the paper discharge tray 63 via the paper discharge roller pair 631.

At this time, if a duplex mode for forming an image on the rear surface of the paper P as well is selected, the image forming apparatus 100 switches the gate 67 to the reverse conveyance path 66 at timing immediately before the trailing end in a discharging direction of the paper P halfway being discharged toward the paper discharge tray 63 passes through a nip of the paper discharge roller pair 631, reverses the paper discharge roller pair 631, and switches back and conveys the paper P. Consequently, the image forming apparatus 100 directs the trailing end of the paper P to the reverse conveyance path 66, reverses the paper P, and feeds the paper P into the nip of the transfer roller pair 37.

The image forming apparatus 100 forms, on the surface of the intermediate transfer belt 40, a toner image based on image data to be formed on the rear surface of the paper P, causes the intermediate transfer belt 40, on which the color toner images are held, to travel, and feeds the color toner images into the nip of the transfer roller pair 37. Further, the image forming apparatus 100 transfers the toner images onto the rear surface of the reversed paper P and fixes the toner images on the rear surface, and discharges the paper P to the paper discharge tray 63 via the paper discharge roller pair 631.

The image forming apparatus 100 includes a control unit (e.g., a controller, etc.) 70 that controls operations of the mechanisms explained above. The control unit 70 includes a processor such as a CPU and a memory. The processor executes a program stored in the memory, whereby the control unit 70 implements various processing functions. The control unit 70 controls the original reading device 10 to thereby acquire image information from an original document. The control unit 70 controls the image forming unit 30 to thereby form an image on the surface of the paper P. For example, the control unit 70 inputs image information read by the original reading device 10 to the image forming unit 30. The control unit 70 controls operations of the pluralities of conveying roller pairs 641 and 661 and conveys the paper P through the conveyance path 64 and the reverse conveyance path 66.

The solid-state head 504 of the black unit 304 is explained below with reference to FIGS. 3 to 6. Since solid-state heads 501, 502, and 503 of the other color units 301, 302, and 303 have the same structure as the structure of the solid-state head 504, detailed explanation of the solid-state heads 501, 502, and 503 is omitted.

Figure 3:
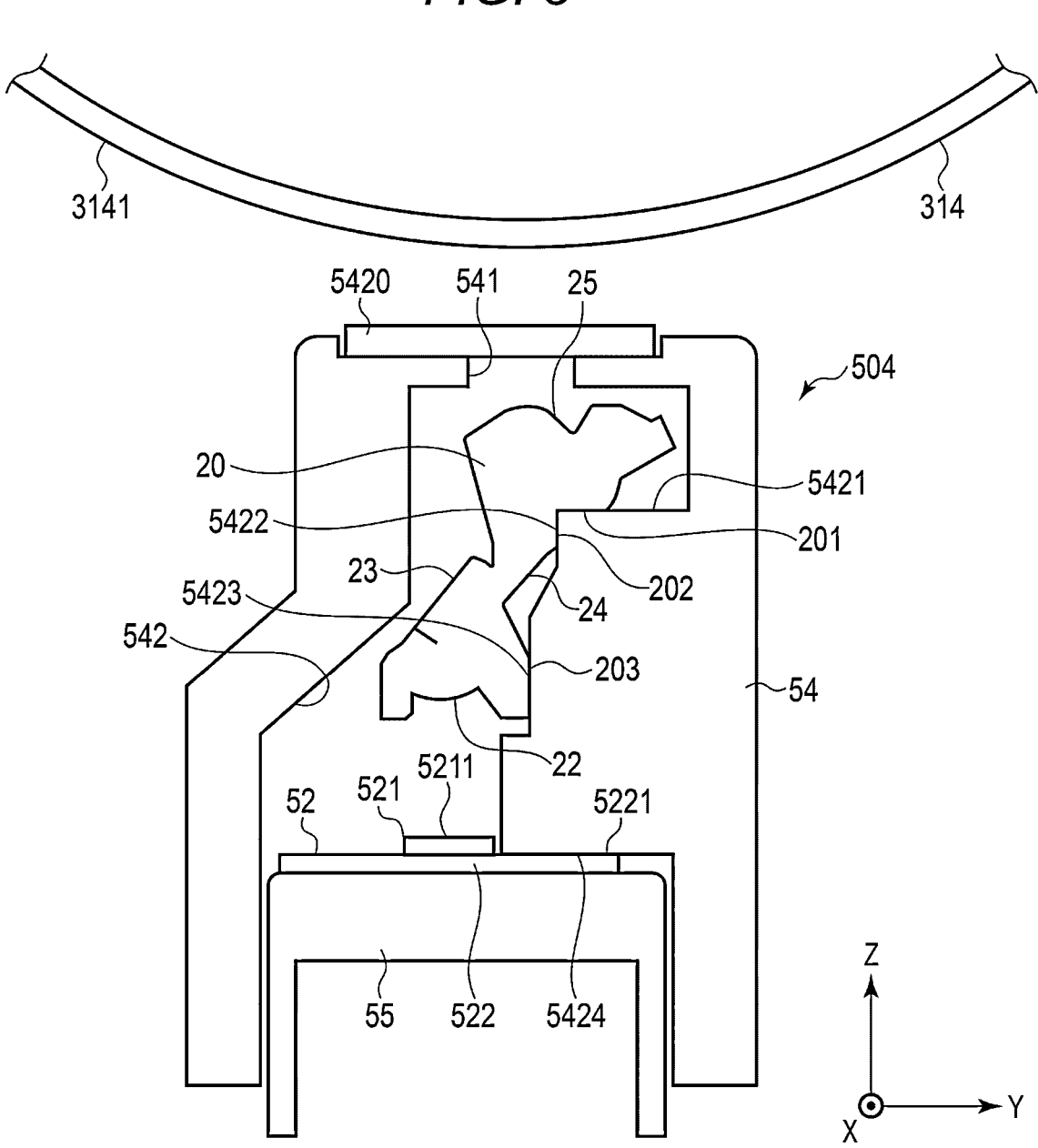
FIG. 3 is a schematic diagram illustrating a solid-state head of the black unit of FIG. 2.

As illustrated in FIG. 3, the solid-state head 504 is separated from and opposed to the photoconductive drum 314 in the downward direction in FIG. 3. The solid-state head 504 includes the lens mirror array 20, a light source unit (e.g., a light source, a light source device, a light provider, etc.) 52, and a holder 54. The holder 54 fixes the lens mirror array 20 and the light source unit 52 in a state in which the lens mirror array 20 and the light source unit 52 are accurately positioned in an optical axis direction. The lens mirror array 20 is an example of the optical member described in the claims of this application. The components 20, 52, and 54 of the solid-state head 504 extend in the main scanning direction orthogonal to the paper surface parallel to the rotation axis of the photoconductive drum 314 and has substantially the same length as the length of the photoconductive drum 314.

Figure 4:
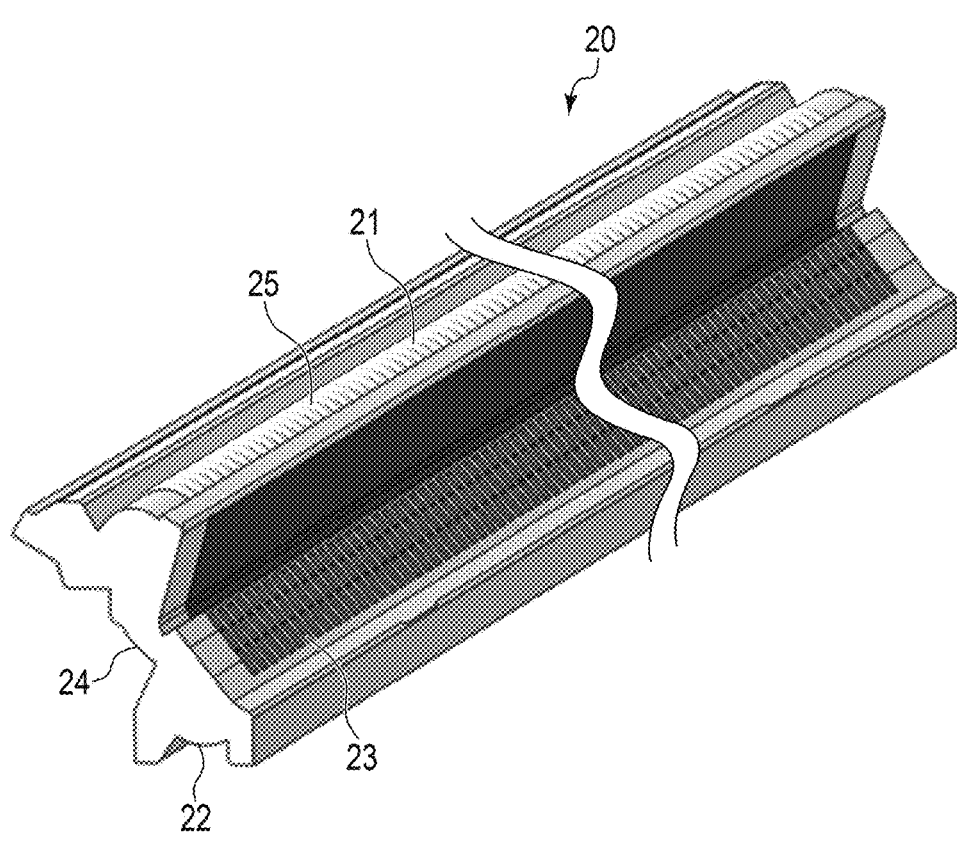
FIG. 4 is a perspective view illustrating a lens mirror array built in the solid-state head.
Figure 5:
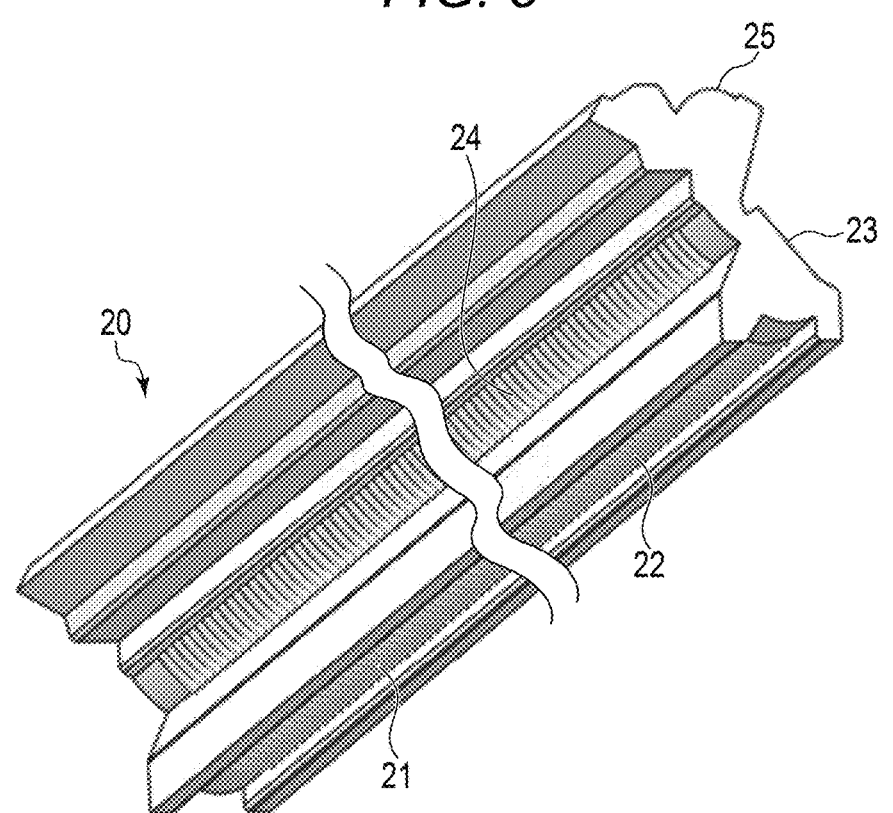
FIG. 5 is a perspective view of the lens mirror array viewed from another direction.
Figure 6:
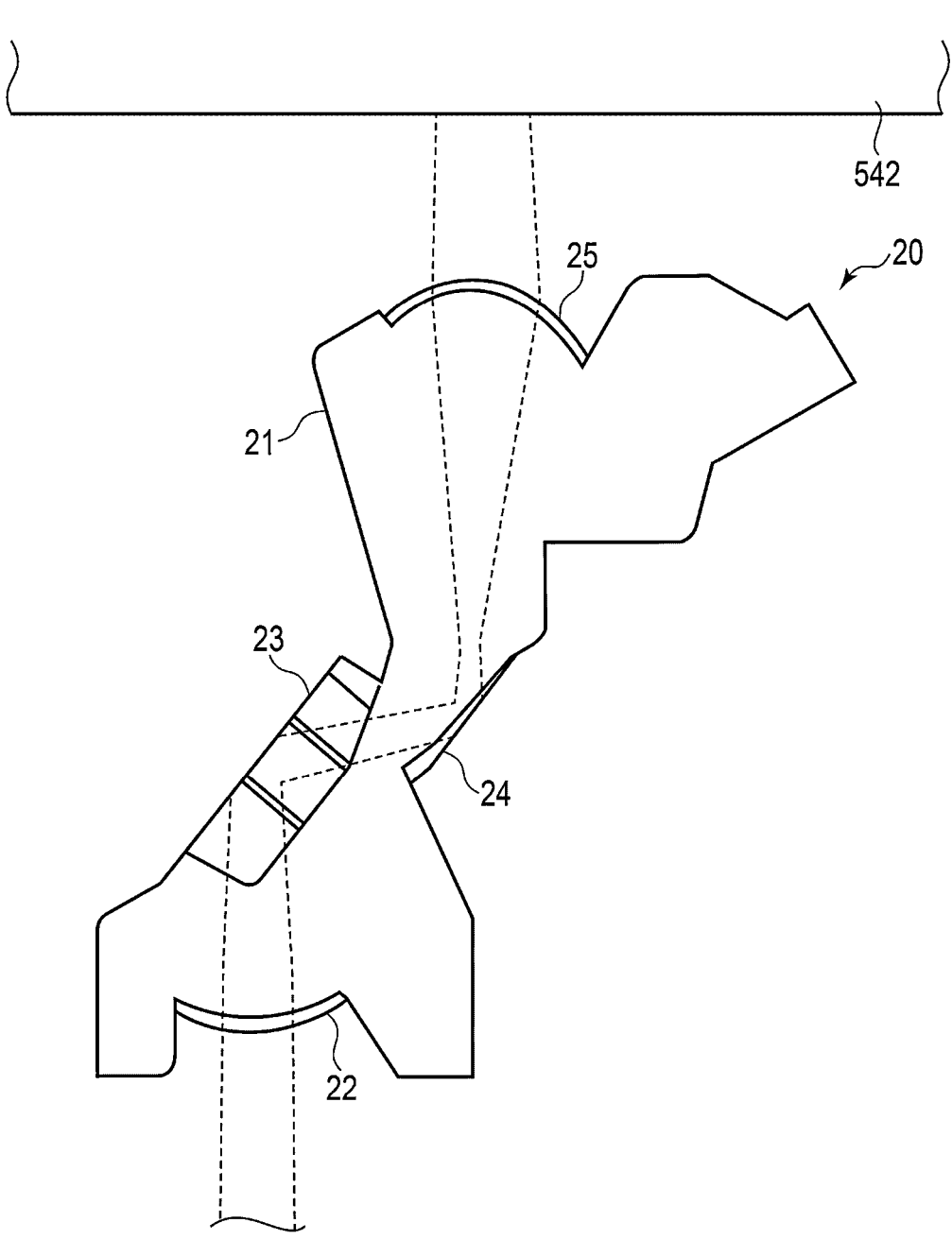
FIG. 6 is a sectional view of the lens mirror array.

As illustrated in FIGS. 4 and 5, the lens mirror array 20 has structure in which a plurality of transparent optical elements 21 having the same shape are disposed side by side in the main scanning direction and integrally connected. FIG. 6 illustrates a cross section of the lens mirror array 20 taken along a surface orthogonal to the main scanning direction between two optical elements 21 adjacent to each other. The surfaces of the plurality of optical elements 21 are continuous surfaces connected in the main scanning direction over the entire length of the lens mirror array 20. In this embodiment, the lens mirror array 20 is formed by injection-molding transparent resin. The lens mirror array 20 maybe formed by transparent glass.

The optical elements 21 of the lens mirror array 20 guide diffused light from an object point to form an image at an image forming point. One optical element 21 causes lights from a plurality of object points disposed side by side in the main scanning direction to form images on an image surface. For example, one optical element 21 causes lights from objects points disposed in width twice to three times as large as a pitch in the main scanning direction of the optical elements 21 to form images on the image surface.

In the solid-state head 504, object points of the plurality of optical elements 21 of the lens mirror array 20 are set on a light emission surface 5211 of a light emitting element 521 of the light source unit 52 and imaging forming points of the optical elements 21 are set on a surface 3141 of the photoconductive drum 314. Since the lens mirror array 20 of the solid-state head 504 includes the plurality of optical elements 21 disposed side by side in the main scanning direction, the lens mirror array 20 guides lights emitted from a plurality of light emitting elements 521 disposed side by side in the main scanning direction and forms an elongated image in the main scanning direction on the surface 3141 of the photoconductive drum 314.

The optical element 21 has, on the surface thereof, an incident-side lens surface 22, an upstream-side reflection surface 23, a downstream-side reflection surface 24, and an emission-side lens surface 25. The incident-side lens surface 22, the downstream-side reflection surface 24, and the emission-side lens surface 25 are curved surfaces convex to the outer side. The upstream-side reflection surface 23 is a flat surface. The optical element 21 reflects, on the two reflection surfaces 23 and 24, light made incident from the incident-side lens surface 22 and emits the light via the emission-side lens surface 25. Since the optical element 21 has the two reflection surfaces 23 and 24, the optical element 21 forms an erected image of an object point at an image forming point.

The incident-side lens surface 22 of the plurality of optical elements 21 is an example of the incident surface described in the claims of this application. The emission-side lens surface 25 of the plurality of optical elements 21 is an example of the emission surface described in the claims of this application. The upstream-side reflection surface 23 and the downstream-side reflection surface 24 are examples of the reflection surface described in the claims of this application.

The incident-side lens surface 22 of the optical element 21 has a shape in which the center axis of the incident-side lens surface 22 coincides with the optical axis of light emitted from the light emitting element 521. The upstream-side reflection surface 23 is present on the optical path of the light passing through the incident-side lens surface 22 and disposed to be inclined at approximately 45° (e.g., between a range of 30° to 60 degrees °, etc.) in the sub-scanning direction with respect to the center axis of the incident-side lens surface 22. The downstream-side reflection surface 24 is disposed substantially in parallel to the upstream-side reflection surface 23 in a position deviating in the sub-scanning direction with respect to the upstream-side reflection surface 23. The emission-side lens surface 25 has a center axis extending in parallel to the center axis of the incident-side lens surface 22 in a position deviating in the sub-scanning direction from the center axis of the incident-side lens surface 22. That is, the optical axis of incident light made incident on the incident-side lens surface 22 of the optical element 21 and the optical axis of emission light emitted from the emission-side lens surface 25 are separated in the sub-scanning direction and are positioned in parallel.

The light made incident on the incident-side lens surface 22 of the optical element 21 is diverging light. The incident-side lens surface 22 converges the diverging light and causes the converged light to travel to the upstream-side reflection surface 23. The light reflected on the upstream-side reflection surface 23 and the downstream-side reflection surface 24 once converges and thereafter changes to diffused light and is emitted via the emission-side lens surface 25. The emission-side lens surface 25 converges and emits the light reflected on the downstream-side reflection surface 24. Light passing the center in the main scanning direction of the optical element 21 and passing a cross section orthogonal to the main scanning direction is indicated by a broken line in FIG. 6.

The lens mirror array 20 of the solid-state head 504 needs to form an image of light emitted from the light emitting element 521 on the surface of the photoconductive drum 314 not to cause deviation and distortion in an electrostatic latent image formed on the surface of the photoconductive drum 314. That is, the lens mirror array 20 having extremely high dimension accuracy without deviation and distortion is required in order to form a high-quality image in the image forming apparatus 100 in this embodiment. Since the lens mirror array 20 is flexible and easily bends, the holder 54 holding the lens mirror array 20 needs to have high rigidity not to cause warp and bend in the lens mirror array 20.

In order to form a high-quality image using the solid-state head 504, it is necessary to accurately position relative positions of the lens mirror array 20 and the light source unit 52 and assemble the solid-state head 504. The holder 54 fixes the light source unit 52 and the lens mirror array 20 in an accurately positioned state in the optical axis direction such that the object points of the optical elements 21 of the lens mirror array 20 are located on the light emission surfaces 5211 of the light emitting elements 521 of the light source unit 52. Naturally, the solid-state head 504 needs to be accurately positioned with respect to the surface 3141 of the photoconductive drum 314 and attached.

As illustrated in FIG. 3, the light source unit 52 includes a substrate 522 on which the plurality of light emitting elements 521 are mounted side by side in the main scanning direction. A row of the plurality of light emitting elements 521 disposed side by side in the main scanning direction may be one row or may be a plurality of rows disposed side by side in the sub-scanning direction. A direction orthogonal to a mounting surface 5221 of the substrate 522 is parallel to the optical axis direction of lights emitted from the plurality of light emitting elements 521 and is the first direction described in the claims of this application. The light emitting element 521 is an example of the light source described in the claims of this application. The mounting surface 5221 of the substrate 522 of the light source unit 52 is an example of the first positioning surface described in the claims of this application. In FIG. 3, the main scanning direction is indicated by an arrow X, the sub-scanning direction is indicated by an arrow Y, and the optical axis direction is indicated by an arrow Z.

The lens mirror array 20 has, on the surface between the downstream-side reflection surface 24 and the emission-side lens surface 25 of the plurality of optical elements 21, a contact surface 201 for positioning the optical axis direction (e.g., a Z direction) with respect to the holder 54. The contact surface 201 is a flat surface that is parallel to a surface (e.g., an XY plane) orthogonal to the optical axis direction in a state in which the lens mirror array 20 is built in the solid-state head 504 and is an example of the second positioning surface described in the claims of this application. The contact surface 201 of the lens mirror array 20 is present in a position overlapping the mounting surface 5221 of the substrate 522 of the light source unit 52 in the optical axis direction in the state in which the lens mirror array 20 is built in the solid-state head 504.

The lens mirror array 20 has, on the surface between the downstream-side reflection surface 24 of the plurality of optical elements 21 and the contact surface 201, a contact surface 202 for positioning the sub-scanning direction (e.g., a Y direction) with respect to the holder 54. The lens mirror array 20 has, on the surfaces between the incident-side lens surface 22 and the downstream-side reflection surface 24 of the plurality of optical elements 21, a contact surface 203 for positioning the sub-scanning direction (e.g., the Y direction) with respect to the holder 54. The two contact surfaces 202 and 203 are present in positions separated in the optical axis direction. The two contact surfaces 202 and 203 are flat surfaces that are parallel to a surface (e.g., an XZ plane) orthogonal to the optical axis direction and orthogonal to the main scanning direction (e.g., an X direction) in a state in which the lens mirror array 20 is built in the solid-state head 504 and are examples of the fifth positioning surface described in the claims of this application.

The holder 54 can be formed by synthetic resin such as polycarbonate. The holder 54 is desirably formed by a material having as small a coefficient of thermal expansion as possible in order to improve dimension accuracy of the holder 54. The holder 54 can be formed by, for example, aluminum, or any other suitable material. The holder 54 is integrally formed by a single member.

The holder 54 includes, at the upper end, a slit 541 extended in the main scanning direction. The lens mirror array 20 and the light source unit 52 are housed and disposed on the inside of the holder 54. The slit 541 allows light emitted via the emission-side lens surface 25 of the lens mirror array 20 to pass and guides the light to the surface 3141 of the photoconductive drum 314. A cover glass 5420 is present on the photoconductive drum 314 side of the slit 541.

An inner surface 542 defining a housing space in the holder 54 includes three contact surfaces 5421, 5422, and 5423 for positioning the lens mirror array 20 and a contact surface 5424 for positioning the light source unit 52. The contact surfaces 5422 and 5423 are surfaces parallel to the XZ plane and are surfaces for positioning the lens mirror array 20 in the sub-scanning direction. The contact surface 5421 is a surface parallel to the XY plane and is a surface for positioning the lens mirror array 20 in the optical axis direction. The contact surface 5424 is a surface parallel to the XY plane and is a surface for positioning the light source unit 52 in the optical axis direction. The contact surface 5424 of the holder 54 is an example of the third positioning surface described in the claims of this application. The contact surface 5421 of the holder 54 is an example of the fourth positioning surface described in the claims of this application. The two contact surfaces 5424 and 5421 are in a positional relation in which the two contact surfaces 5424 and 5421 overlap in the optical axis direction. The contact surfaces 5422 and 5423 of the holder 54 are examples of the sixth positioning surface described in the claims of this application.

If the lens mirror array 20 is attached to the holder 54, the contact surface 201 of the lens mirror array 20 is set in surface contact with the contact surface 5421 of the holder 54, the contact surface 202 of the lens mirror array 20 is set in surface contact with the contact surface 5422 of the holder 54, the contact surface 203 of the lens mirror array 20 is set in surface contact with the contact surface 5423 of the holder 54, and the lens mirror array 20 is positioned with respect to the holder 54. In this state, an adhesive is provided between the lens mirror array 20 and the inner surface 542 of the holder 54 and the lens mirror array 20 is fixed to the holder 54. Fixing parts by the adhesive are a plurality of parts separated in the main scanning direction and are positions not interfering with the incident-side lens surface 22, the upstream-side reflection surface 23, the downstream-side reflection surface 24, and the emission-side lens surface 25 of the lens mirror array 20.

Alternatively, the lens mirror array 20 maybe fixed to the holder 54 by, using a not-illustrated leaf spring or the like, pressing the contact surface 201 of the lens mirror array 20 against the contact surface 5421 of the holder 54, pressing the contact surface 202 of the lens mirror array 20 against the contact surface 5422 of the holder 54, and pressing the contact surface 203 of the lens mirror array 20 against the contact surface 5423 of the holder 54. In this case, the adhesive may not be used.

If the light source unit 52 is attached to the holder 54, the mounting surface 5221 of the substrate 522 is set in surface contact with the contact surface 5424 of the holder 54 and the light source unit 52 is positioned with respect to the holder 54. In this state, a supporting member 55, to which the surface opposite to the mounting surface 5221 of the light source unit 52 is fixed, and the holder 54 are fixed.

As explained above, according to this embodiment, the holder 54 formed by the single member has the contact surface 5424 for positioning the light source unit 52 in the optical axis direction and has, in the position overlapping the contact surface 5424 in the optical axis direction, the contact surface 5421 for positioning the lens mirror array 20 in the optical axis direction. Therefore, by setting the mounting surface 5221 of the light source unit 52 in surface contact with the contact surface 5424 of the holder 54 to fix the light source unit 52 to the holder 54 and setting the contact surface 201 of the lens mirror array 20 in surface contact with the contact surface 5421 of the holder 54 to fix the lens mirror array 20 to the holder 54, it is possible to accurately position and dispose the lens mirror array 20 in the optical axis direction with respect to the light source unit 52.

Therefore, according to this embodiment, unlike the related art, it is unnecessary to perform adjustment work for, in order to position the lens mirror array 20 in the optical axis direction with respect to the light source unit 52, in a state in which one of the light source unit 52 and the lens mirror array 20 is provisionally fixed to the holder 54, causing the light emitting element 521 to emit light, detecting, with a camera or the like, an image formed on the image surface via the lens mirror array 20, and positioning the light source unit 52 or the lens mirror array 20 in a position where deviation does not occur in the image. It is possible to obtain stable optical performance after simplifying an assembly process.

By disposing, in the positions overlapping in the optical axis direction, the part where the mounting surface 5221 of the light source unit 52 is in contact with the contact surface 5424 of the holder 54 and the part where the contact surface 201 of the lens mirror array 20 is in contact with the contact surface 5421 of the holder 54 as in this embodiment, it is possible to further improve the positioning accuracy in the optical axis direction of the light source unit 52 and the lens mirror array 20. If the part where the light source unit 52 is in contact with the holder 54 and the part where the lens mirror array 20 is in contact with the holder 54 do not overlap in the optical axis direction, the positioning accuracy of the light source unit 52 and the lens mirror array 20 is deteriorated by being affected by a dimension change in the sub-scanning direction due to, for example, thermal expansion of the holder 54. Accordingly, it is effective to dispose the part where the mounting surface 5221 of the light source unit 52 is in contact with the contact surface 5424 of the holder 54 and the part where the contact surface 201 of the lens mirror array 20 is in contact with the contact surface 5421 of the holder 54 in the positions overlapping in the optical axis direction as in this embodiment Note that, in the embodiment explained above, the mounting surface 5221 of the light source unit 52 and the contact surface 5424 of the holder 54 are set in contact and the contact surface 201 of the lens mirror array 20 and the contact surface 5421 of the holder 54 are set in contact. However, the surfaces 5221, 5424, 201, and the 5421 only have to be surfaces orthogonal to the optical axis direction and may be other surfaces provided on the surfaces of the members.

Figure 7:
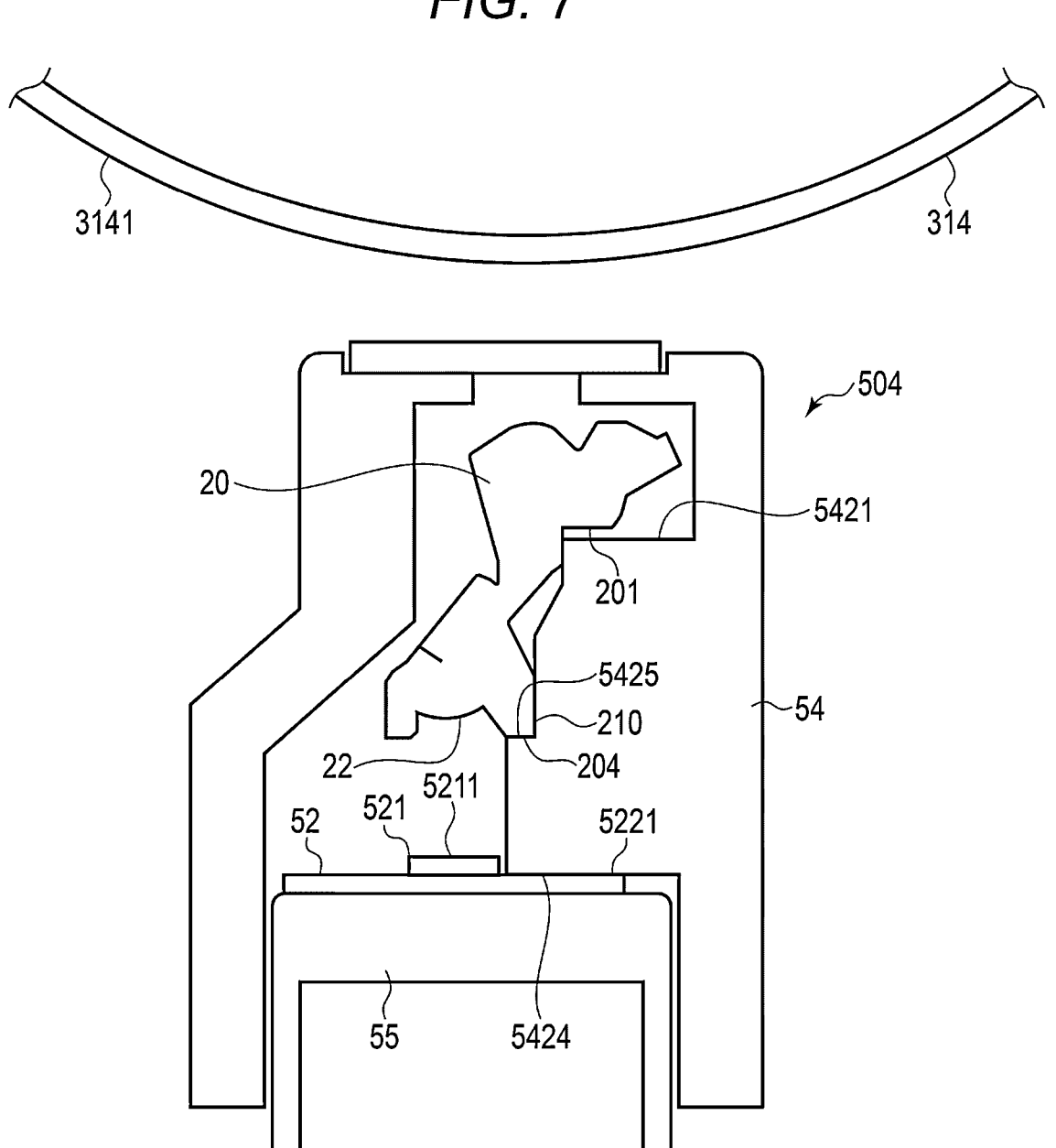
FIG. 7 is a schematic diagram illustrating another fixing structure of the lens mirror array.

For example, the shape of the holder 54 maybe changed and, as illustrated in FIG. 7, the contact surface 201 of the lens mirror array 20 maybe separated from the contact surface 5421 of the holder 54 and, instead, a contact surface 204 present at the distal end of a flange portion 210 of the lens mirror array 20 may be set in surface contact with a contact surface 5425 of the holder 54.

In this case, the contact surface 204 closer to the light source unit 52 than the incident-side lens surface 22 in the optical axis direction can be set in contact with the contact surface 5425 of the holder 54. Even if the holder 54 is thermally expanded, since the distance between the contact surface 5425 and the contact surface 5424 is shorter than the distance in the embodiment (FIG. 3) explained above, a dimension change in the optical axis direction can be reduced. It is possible to suppress positional deviation in the optical axis direction of the light source unit 52 and the lens mirror array 20.

Note that, if the lens mirror array 20 is set in contact with the holder 54 as illustrated in FIG. 7, it is considered difficult to apply the adhesive for fixing the lens mirror array 20 to the holder 54. However, in that case, the lens mirror array 20 maybe urged by a leaf spring or the like to press the contact surface 204 of the lens mirror array 20 against the contact surface 5425 of the holder 54.

Figure 8:
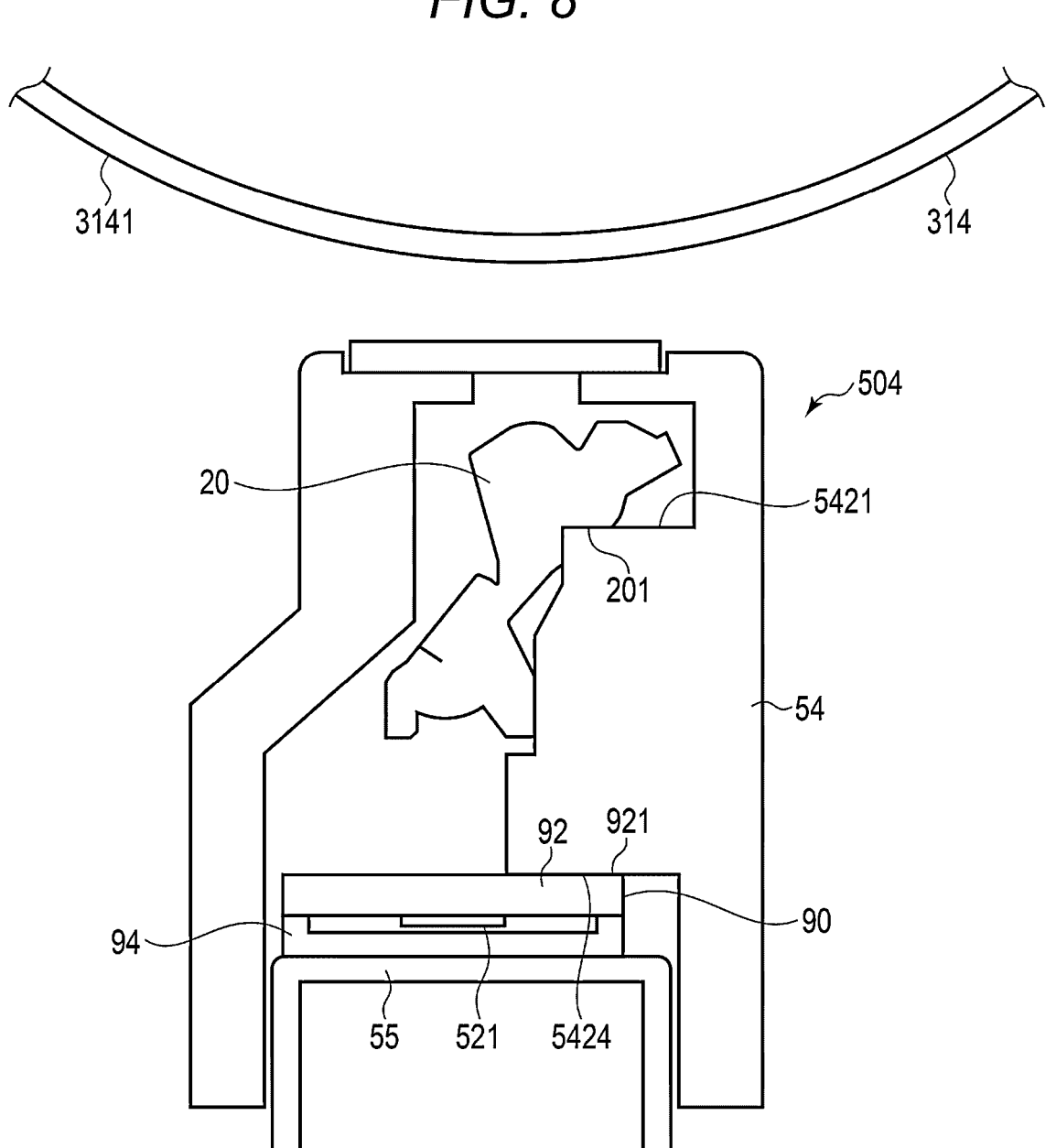
FIG. 8 is a schematic diagram illustrating a fixing structure of another light source unit.

If a light source unit 90 is fixed to the holder 54 instead of the light source unit 52 as illustrated in FIG. 8, a surface 921 of a light transmission panel 92 can be set in surface contact with the contact surface 5424 of the holder 54 to position the light source unit 90 in the optical axis direction. The light source unit 90 has structure in which the light emitting element 521 is fixed to the light transmission panel 92 and the light emitting element 521 is covered by a cover member 94.

Figure 9:
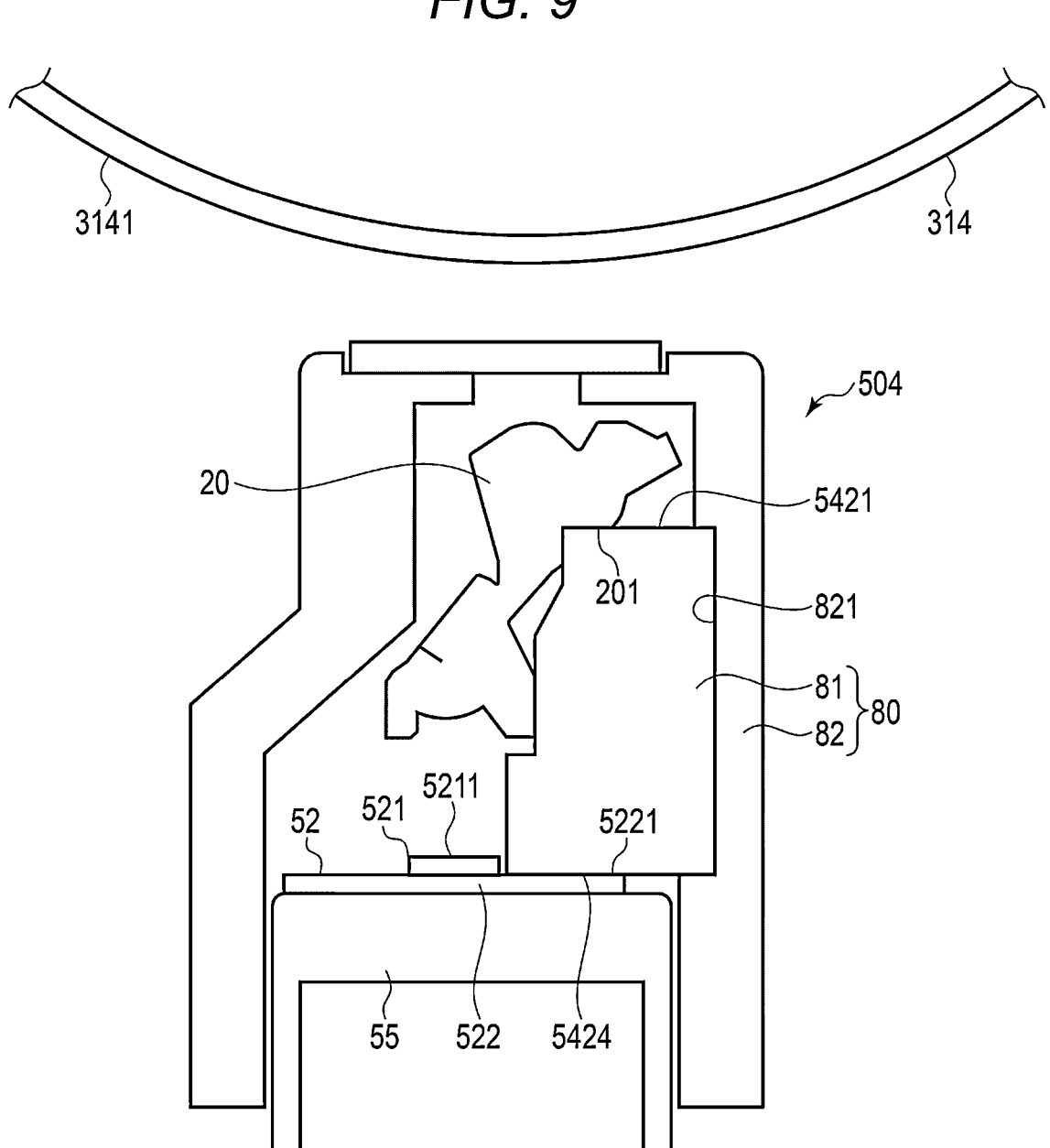
FIG. 9 is a schematic diagram illustrating a modification of the solid-state head.

In the embodiment explained above, the holder 54 holding the light source unit 52 and the lens mirror array 20 is formed by the single member. However, for example, as illustrated in FIG. 9, a holder 80 formed by combining two members may be used. The holder 80 has the same shape as the shape of the holder 54 in the embodiment explained above in a state in which a fixing member 81 and a supporting member 82 are combined as illustrated in FIG. 9.

The fixing member 81 includes the contact surface 5424 that is in surface contact with the mounting surface 5221 of the substrate 522 of the light source unit 52 and the contact surface 5421 that is in surface contact with the contact surface 201 of the lens mirror array 20. The supporting member 82 includes a recess 821 in which a part of the fixing member 81 is fit. In this way, even if the holder 80 is formed by combining a plurality of members, by providing the two contact surfaces 5424 and 5421 on the surface of the fixing member 81, which is a single member, it is possible to accurately position the light source unit 52 and the lens mirror array 20 in the optical axis direction.

Figure 10:
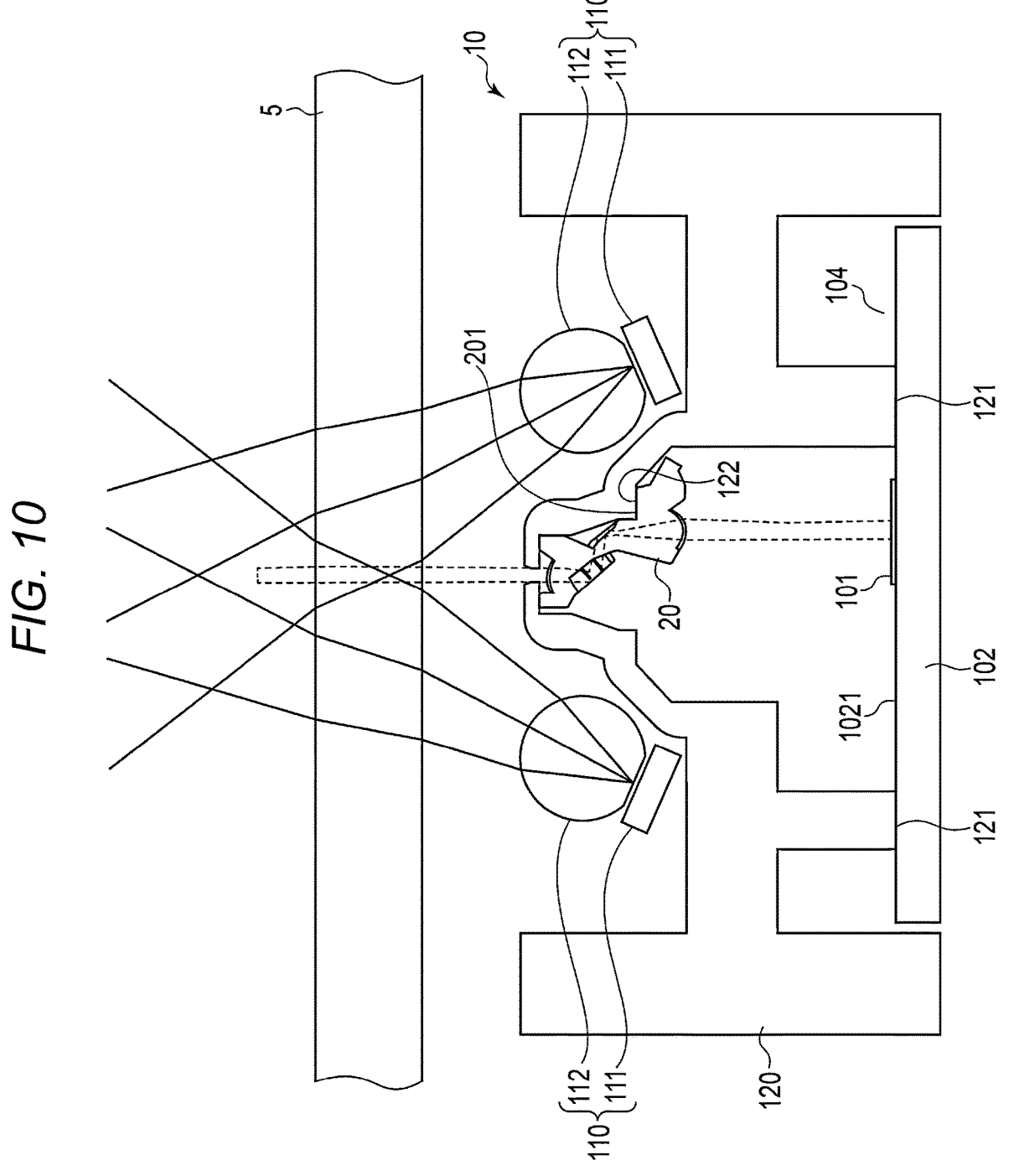
FIG. 10 is a schematic diagram illustrating an original reading device of the image forming apparatus.

FIG. 10 is a schematic diagram of the original reading device 10. The original reading device 10 includes a reading unit (e.g., a reader, etc.) 104 including a substrate 102 on which the image sensor 101 is mounted, the lens mirror array 20, a pair of illumination units 110, and a housing 120 that positions and fixes the members 104, 20, and 110.

The image sensor 101 is, for example, a long CCD (Charge Coupled Device) sensor or a long CMOS (Complementary Metal Oxide Semiconductor) sensor extended in the main scanning direction. The illumination unit 110 includes a long light emitting unit (e.g., a long light emitter, etc.) 111 extended in the main scanning direction and a long light guide body 112 extended in the main scanning direction that guides illumination light emitted from the light emitting unit 111 and illuminates an original document surface.

The lens mirror array 20 of the original reading device 10 is attached in a direction vertically reversed from the direction of the lens mirror array 20 of the solid-state head 504. In the original reading device 10, an object point of the lens mirror array 20 is present on an original document surface and an image forming point is present on a light receiving surface of the image sensor 101. That is, the lens mirror array 20 of the original reading device 10 guides light reflected on the original document surface and forms an image on the light receiving surface of the image sensor 101.

The housing 120 has, on the surface thereof, a contact surface 121 that is in surface contact with a mounting surface 1021 of the substrate 102 of the reading unit 104 and a contact surface 122 that is in surface contact with the contact surface 201 of the lens mirror array 20. The housing 120 is formed by a single member such as synthetic resin having a small coefficient of thermal expansion. In an illustrated state in which the reading unit 104 and the lens mirror array 20 are fixed to the housing 120, the two contact surfaces 121 and 122 of the housing 120, the mounting surface 1021 of the reading unit 104, and the contact surface 201 of the lens mirror array 20 are surfaces orthogonal to the optical axis direction of the lens mirror array 20.

That is, in the original reading device 10, as in the solid-state head 504 explained above, it is possible to accurately position the reading unit 104 and the lens mirror array 20 in the optical axis direction and obtain a satisfactory optical characteristic.

Although several embodiments are explained above, these embodiments are presented as examples and are not intended to limit the scope of invention. These new embodiments can be implemented in other various forms. Various omissions, substitutions, and changes can be made without departing from the spirit of the invention. These embodiments and modifications thereof are included in the scope of the invention and included in the inventions described in the claims and a scope of equivalents of the inventions.

What is claimed is:

1. An optical device comprising:
a light source device comprising a light source that emits light in a first direction and a first positioning surface orthogonal to the first direction;
an optical member disposed a distance away from and opposite to the light source device in the first direction, the optical member comprises:
an incident surface on which the light emitted from the light source is made incident,
an emission surface from which the light made incident via the incident surface is emitted, and
a second positioning surface provided in a position orthogonal to the first direction and overlapping the first positioning surface in the first direction; and
a holder comprising:
a third positioning surface that is in surface contact with the first positioning surface, and
a fourth positioning surface that is in surface contact with the second positioning surface and is provided in a position overlapping the third positioning surface in the first direction,
wherein the holder is configured to hold the light source device in a state in which the first positioning surface of the light source device is in surface contact with the third positioning surface and hold the optical member in a state in which the second positioning surface of the optical member is in surface contact with the fourth positioning surface.

2. The device according to claim 1, wherein
the light source comprises a plurality of light emitters configured to provide light,
the light source device comprises a substrate on which the plurality of light emitters are mounted side by side in a second direction orthogonal to the first direction, and
the first positioning surface is a mounting surface of the substrate.

3. The device according to claim 2, wherein the optical member is a lens mirror array including a plurality of optical elements disposed side by side in the second direction, each of the plurality of optical elements comprises an incident-side lens surface, an emission-side lens surface, and a reflection surface that reflects light made incident via the incident-side lens surface toward the emission-side lens surface.

4. The device according to claim 3, wherein the second positioning surface is present on a surface of the lens mirror array between the reflection surface and the emission-side lens surface of each the plurality of optical elements.

5. The device according to claim 3, wherein
the optical member comprises a fifth positioning surface orthogonal to the second positioning surface, and
the holder comprises a sixth positioning surface that is in surface contact with the fifth positioning surface.

6. The device according to claim 1, holder further comprises:
a fixing member comprising the third positioning surface and the fourth positioning surface, and
a supporting member comprising a recess, the fixing member positioned within the recess.

7. An optical device comprising:
a light source device comprising a light source that emits light in a first direction and a first positioning surface orthogonal to the first direction;
a lens mirror array disposed a distance away from and opposite to the light source device in the first direction, the lens mirror array comprises:
an incident-side lens surface on which the light emitted from the light source is made incident,
an emission-side lens surface from which the light made incident via the incident surface is emitted,
a second positioning surface provided in a position orthogonal to the first direction and overlapping the first positioning surface in the first direction, and
a lens contact surface positioned on an end nearest the light source device; and
a holder comprising:
a third positioning surface that is in surface contact with the first positioning surface,
a fourth positioning surface that is positioned a distance away from the second positioning second positioning surface and is provided in a position overlapping the third positioning surface in the first direction, and
a holder contact surface in surface contact with the lens contact surface
wherein the holder is configured to hold the light source device in a state in which the first positioning surface of the light source device is in surface contact with the third positioning surface and hold the optical member in a state in which the second positioning surface of the optical member is in surface contact with the fourth positioning surface.

8. The optical device of claim 7, wherein the lens array further comprises a flange, wherein the lens contact surface is positioned on a distal end of the flange.

9. The device according to claim 7, wherein
the light source comprises a plurality of light emitters configured to provide light,
the light source device comprises a substrate on which the plurality of light emitters are mounted side by side in a second direction orthogonal to the first direction, and
the first positioning surface is a mounting surface of the substrate.

10. The device according to claim 9, wherein the lens mirror array including a plurality of optical elements disposed side by side in the second direction, each of the plurality of optical elements comprises the incident-side lens surface, the emission-side lens surface, and a reflection surface that reflects light made incident via the incident-side lens surface toward the emission-side lens surface.

11. The device according to claim 10, wherein the second positioning surface is present on a surface of the lens mirror array between the reflection surface and the emission-side lens surface of each the plurality of optical elements.

12. The device according to claim 7, holder further comprises:
a fixing member comprising the third positioning surface and the fourth positioning surface, and
a supporting member comprising a recess, the fixing member positioned within the recess.

13. The device according to claim 7, further comprising a leaf spring configured to press the lens contact surface against the holder contact surface.

14. An optical device comprising: a holder comprising a light source that emits light in a first direction and a first positioning surface orthogonal to the first direction, wherein the light source comprises a light transmission panel orthogonal to the first direction; an optical member disposed a distance away from and opposite to the light source in the first direction, the optical member comprises: an incident surface on which the light emitted from the light source is made incident, an emission surface from which the light made incident via the incident surface is emitted, and a second positioning surface provided in a position orthogonal to the first direction and overlapping the first positioning surface in the first direction; and wherein the holder further comprises: a third positioning surface that is in surface contact with the light transmission panel, and a fourth positioning surface that is in surface contact with the second positioning surface and is provided in a position overlapping the third positioning surface in the first direction, wherein the holder is configured to position the light source in an optical axial direction.

15. The device according to claim 14, wherein
the light source comprises a plurality of light emitters fixed to the light transmission panel positioned side by side in a second direction orthogonal to the light transmission panel, the plurality of light emitters configured to provide light.

16. The device according to claim 15, further comprising a cover member configured to cover the plurality of light emitters.

17. The device according to claim 15, wherein the optical member is a lens mirror array including a plurality of optical elements disposed side by side in the second direction, each of the plurality of optical elements comprises an incident-side lens surface, an emission-side lens surface, and a reflection surface that reflects light made incident via the incident-side lens surface toward the emission-side lens surface.

18. The device according to claim 17, wherein the second positioning surface is present on a surface of the lens mirror array between the reflection surface and the emission-side lens surface of each the plurality of optical elements.

19. The device according to claim 17, wherein
the optical member comprises a fifth positioning surface orthogonal to the second positioning surface, and
the holder comprises a sixth positioning surface that is in surface contact with the fifth positioning surface.

20. The device according to claim 14, holder further comprises:
a fixing member comprising the third positioning surface and the fourth positioning surface, and a supporting member comprising a recess, the fixing
member positioned within the recess.

\* \* \* \* \*